United States Patent [19]

Loy et al.

[11] Patent Number: 4,515,234
[45] Date of Patent: May 7, 1985

[54] STABILIZING AND ISOLATION SYSTEM FOR A VEHICLE CAB

[75] Inventors: Robert E. Loy, Bucyrus; Dale R. Phillips, Crestline, both of Ohio; Paul E. Willis, Orrstown, Pa.

[73] Assignee: Dresser Industries, Inc., Dallas, Tex.

[21] Appl. No.: 514,115

[22] Filed: Jul. 15, 1983

[51] Int. Cl.³ .............................................. B62D 27/04
[52] U.S. Cl. .................................. 180/89.12; 280/755; 296/190
[58] Field of Search ............... 180/89.12, 89.13, 89.16; 296/190; 280/755

[56] References Cited

U.S. PATENT DOCUMENTS

| | | | |
|---|---|---|---|
| 3,420,568 | 1/1969 | Henriksson et al. | 296/35 |
| 3,690,720 | 9/1972 | Whisler | 296/28 C |
| 3,793,796 | 8/1976 | Suzuki | 296/28 C |
| 4,082,343 | 4/1978 | Hurt et al. | 180/89.12 |
| 4,135,757 | 1/1979 | Smith et al. | 296/35 R |
| 4,265,328 | 5/1981 | Rowa et al. | 180/89.13 |

Primary Examiner—Richard A. Bertsch
Attorney, Agent, or Firm—Barry E. Deutsch

[57] ABSTRACT

A stabilizing and isolation system for mounting an operator cab on a vehicle frame includes at least one resilient member disposed between the underside of the cab and the frame for resiliently supporting the cab on the frame. Motion limiting members are connected to the frame and the cab for restraining vertical displacement of the cab relative to the frame during a catastrophic event. A stabilizing linkage assembly is connected to the frame and the cab for restraining rolling and pitching motion of the cab relative to the frame, the assembly including resilient means to permit relative vertical motion between the cab and the frame.

4 Claims, 5 Drawing Figures

STABILIZING AND ISOLATION SYSTEM FOR A VEHICLE CAB

BACKGROUND OF THE INVENTION

The present invention relates to a stabilizing and isolation system for mounting an operator cab on a vehicle frame, and more particularly, the invention relates to such a system permitting controlled vertical motion of the cab relative to the frame while restraining relative rolling and pitching motion of the cab.

Heretofore, most operators' cabs in construction vehicles, such as road planers, graders, and the like, have been mounted on the chassis or frame of the vehicle with resilient cushioning means interposed therebetween functioning as a suspension system. Many prior art suspension systems have simply used elastomeric isolators having high spring rate (made from relatively stiff material) to provide a stable suspension. However, since the isolators have been formed from relatively stiff material, the degree of isolation of the cab from the frame has been relatively reduced. By reducing the isolation of the cab from the frame, vibrations and impacts caused by vibrating bodies such as the engine, pump, transmission, cutting drum, and torque converter used on the vehicle or transmitted from the exterior of the vehicle, are applied to the operator's cab thereby raising the noise level in the cab and concomitantly diminishing the comfort level of the operator.

The present invention utilizes elastomeric isolators made from relatively softer material thus providing a relatively low spring rate to provide a "softer" ride for the operator within the cab. However, since isolators made from relatively soft material provide a relatively unstable suspension system, the present invention also includes means to stabilize the cab relative to the frame by restraining pitching and rolling motion of the cab. By using the elastomeric isolators formed from relatively softer material, the cab is more effectively isolated from the frame.

By utilizing the suspension and isolation system of the present invention, numerous advantages are obtained. Such advantages include reduced operator fatigue and increased operator productivity. By isolating the cab relative to the frame, the expected life of the cab related hardware will be prolonged. There will be less need to provide specialized shock mounting for the instrumentation and controls located in the cab. The need to provide a special suspension on the operator's seat will either be reduced or entirely eliminated. By reducing or eliminating the suspension in the operator's seat, only minimum, if any, relative motion between the operator and the controls located in the cab will occur. By minimizing the relative motion between the operator and his controls, there will be significant improvement in safety by providing for more precise control. Further, operator fatigue will be reduced since it is easier to focus the eye on, or grasp and manipulate, a stationary target. Furthermore, by using a relatively "soft" suspension system, the need to isolate the engine from the vehicle frame is either reduced or eliminated.

SUMMARY OF INVENTION

Accordingly, it is an object of this invention to provide a relatively soft, yet stable, suspension system for mounting a cab on a vehicle frame.

It is a further object of this invention to use elastomeric isolators made from relatively soft material having a relatively low spring rate in suspending and isolating a cab from a vehicle frame.

It is a further object of this invention to provide a relatively soft, yet stable, suspension to isolation system to reduce operator fatigue and increase operator productivity.

It is still another object of this invention to effectively suspend a cab from a frame of a vehicle, while isolating the cab from the frame to minimize transmission of noise, shocks, and vibrations from the frame to the cab.

It is still another object of this invention to provide a cab suspension and isolating system having relatively long stroke and low spring rate to provide a low system natural frequency which will effectively isolate the cab from vibration and shock produced during the working operation of the machine.

It is still another object of this invention to suspend a cab from a vehicle frame while insuring that the major cab displacement relative to the frame occurs only in the direction parallel to the axis of the primary suspension members, and thus parallel to the direction of major external vibration.

These and other objects of the present invention are attained in a stabilizing and isolation system for mounting an operator cab on a vehicle frame comprising means disposed between the underside of the cab and the frame for resiliently supporting the cab on the frame; stabilizing linkage assembly connected to the frame and cab for restraining rolling and pitching motion of the cab relative to the frame, said assembly including resilient means to permit relative vertical motion between the cab and the frame; and motion limiting means connected to the frame and the cab for restraining vertical displacement of the cab relative to the frame in the event said resilient support means and said stabilizing linkage assembly should fail during a catastrophic event.

DESCRIPTION OF THE PREFERRED EMBODIMENT

Figure 1:
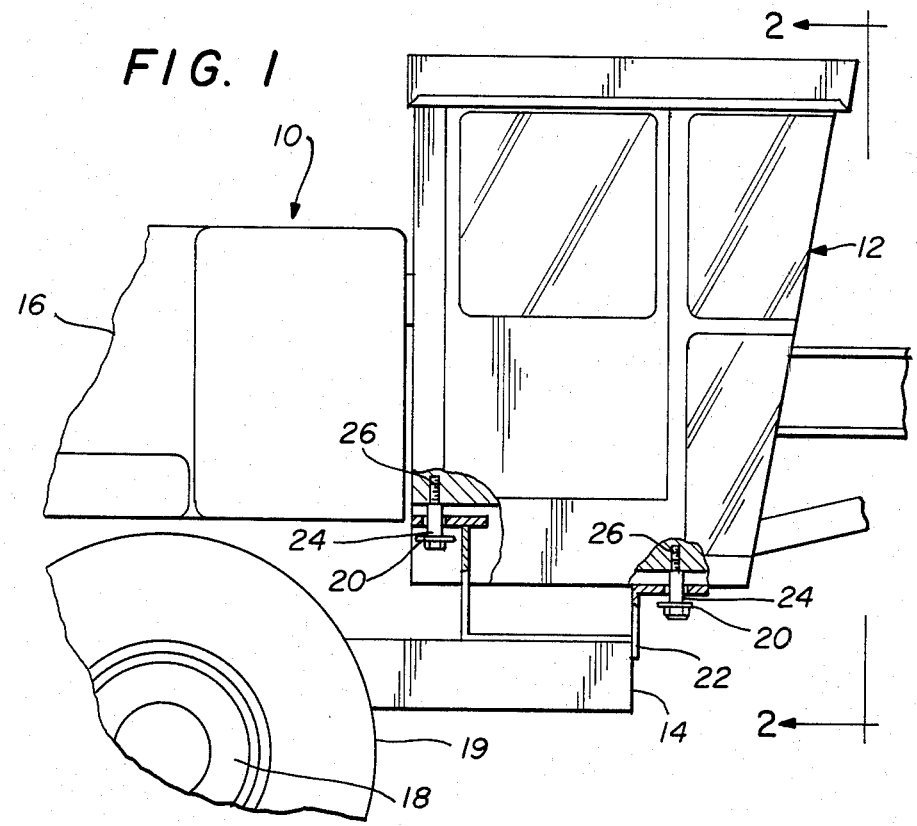
FIG. 1 is a side elevational view of a construction vehicle incorporating the present invention.

Referring now to the drawing, there is illustrated a preferred embodiment of the present invention. In particular, the present invention is embodied in a construction vehicle, illustrated as a road planer of the type employed to cold-plane surfaces of roadways or the like.

In particular, road planer 10 has an operator cab 12 mounted on the main frame 14 of the construction vehicle. An engine compartment 16 is also mounted on the frame rearwardly of the operator cab. A plurality of wheels 18, each having a tire 19 mounted thereon (only one of which is shown) provide the tractive means for moving the planer over the underlying surface.

Construction equipment such as the road planer illustrated herein, are subjected to shocks, vibrations, and impacts as the machine performs its working function. Since operator cab 12 is mounted on frame 14, the operator of the the machine and the various gauges and controls located in the operator cab are likewise subjected to shocks and vibrations unless the machine's suspension system isolates the cab from the frame. However, since the material forming the suspension members has been relatively stiff, the degree of isolation of the cab from the frame has been relatively minimal. With minimal isolation between the cab and frame, vibrations and impacts caused by vibrating bodies such as the engine, pump, cutting drum, transmission and torque converter used on the vehicle or transmitted from the exterior of the vehicle, are applied to the operator's cab thereby raising the noise level in the cab and concomitantly diminishing the comfort level of the operator. The foregoing results in operator fatigue and loss of productivity. To overcome the foregoing problems, the present invention utilizes relatively "soft" suspension means for supporting cab 22 on frame 14.

Figure 2:
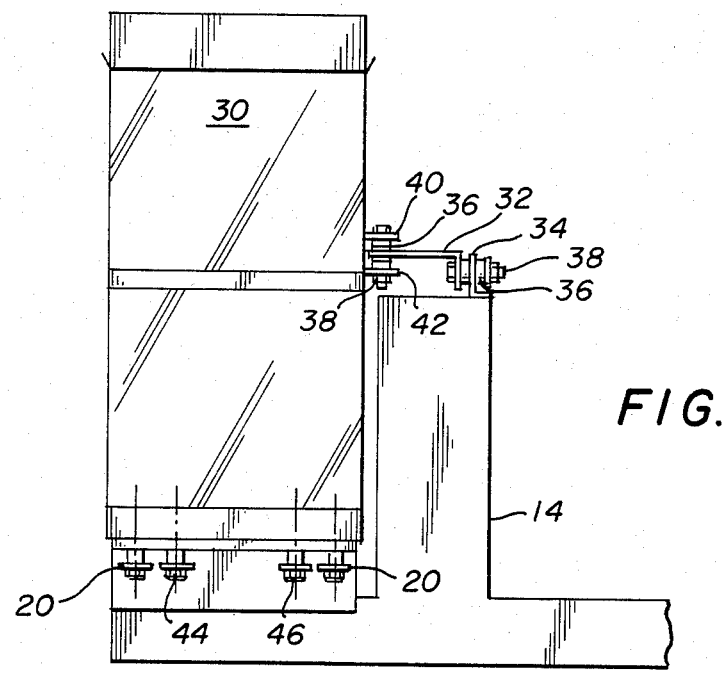
FIG. 2 is a sectional view taken along line 2—2 of FIG. 1.

In particular, and with reference to FIGS. 1 and 2, there is illustrated suspension means 20 comprising an elastomeric member 24 sandwiched between the underside of cab 12 and the top of frame 14. As illustrated in FIG. 2, a bracket 22 may be connected to the frame and act as an extension thereof in sandwiching elastomeric member 24. Elastomeric member 24 is made from a "relatively soft" material such as material rubber or neoprene. The particular material and its degree of rigidity will provide a static load range. In turn, the static load range provides a natural frequency attenuation range. One of the intended functions of elastomeric member 24 is to isolate the operator cab from external noise. Most of the external noise developed by a construction vehicle will fall within a given frequency range. Thus, the elastomeric member chosen for a given application will have a natural frequency attenuation that will be particularly efficient to attenuate the frequency of the external noise. In the preferred embodiment, four suspension means 20 are employed with one being located substantially adjacent each corner of operator cab 12. A bolt or similar means 23 extends between the frame, through elastomeric member 24 and into the underside of operator cab 12 for firmly securing the elastomeric suspension member in place. As suspension means 20 includes elastomeric members made from relatively soft material, the cab is sufficiently isolated from the frame so shocks and vibrations felt by the frame are not transmitted to the operator cab. In effect, the oeprator, located in the cab has a relatively "soft" ride. However, due to the relatively "soft" suspension system used for mounting cab 12 on frame 14, the cab may be relatively unstable especially in pitch and roll directions, thus introducing other problems.

Figure 3:
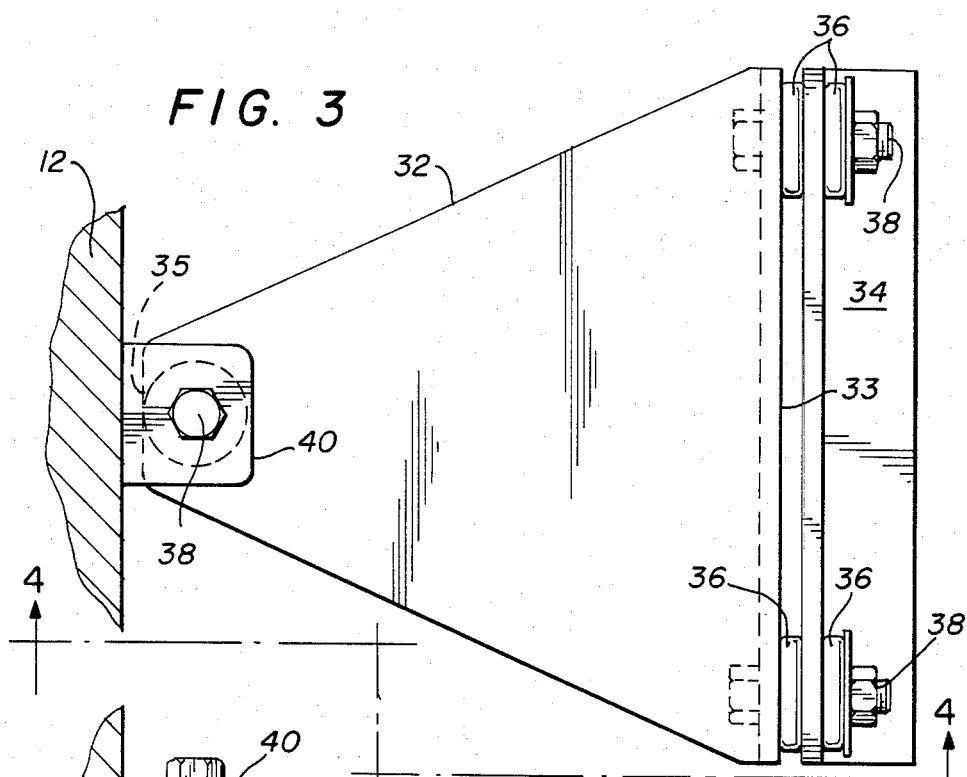
FIG. 3 is a top elevational view, partly in section, illustrating a detail of the present invention.
Figure 4:
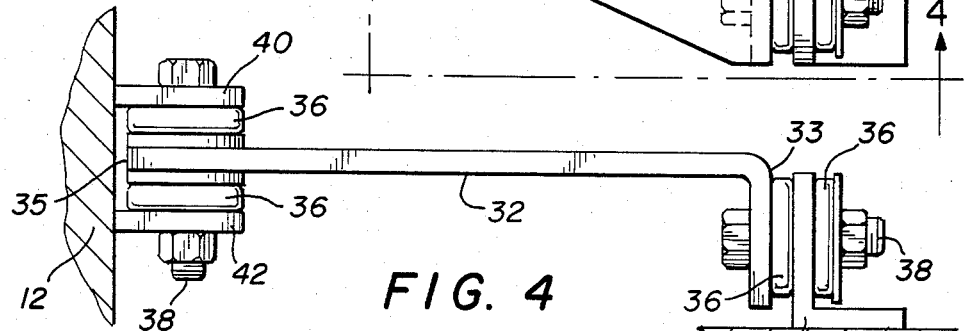
FIG. 4 is a sectional view taken along line 4—4 of FIG. 3.

To enable the "soft" suspension to be employed, yet avoid the problems associated therewith, the present invention utilizes a stabilizing system to control movement of operator cab 12. In particular, and with specific reference to FIGS. 2 through 5, the stabilizing system includes a stabilizing plate 32 disposed in a horizontal plane and connected to frame 14 and operator cab 12. Plate 32 is preferably connected to a bracket 34 attached to frame 14. As illustrated in FIGS. 3 and 4, plate 32 is preferably triangularly shaped and is connected at its apex 35 to cab 12 and at its base 33 to frame 14 via bracket 34. Base 33 and bracket 34 encapsulate therebetween an elastomeric member 36 made from material similar to that forming member 24. It will be noted, with reference to FIG. 3, two identical arrangements are employed at each end of base 33. A bolt or similar securing means 38 extends through bracket 34 and base 33 of plate 32 to firmly secure elastomeric member 36 in place.

Apex 35 of triangular plate 32 is secured to cab 12 by a similar elastomeric member 36 encapsulated between brackets 40 and 42 secured to the cab and to the apex. A bolt 38 or similar means is used to permanently secure elastomeric member 36 in place. Plate 32 is secured to one side 30 of cab 12. Plate 32, in combination with its associated elastomeric members 36 and brackets 34, 40 and 42, permits an unrestrained vertical movement of operator cab 12 but prevents essentially all rolling and pitching of the cab relative to frame 14. Essentially, the combination of elastomeric members 36 and plate 32 permit unrestrained movement of the operator cab in a direction parallel to the longitudinal axes of suspension means 20, i.e. in the vertical direction. However, plate 32 and its associated means connecting the plate to cab 12 and frame 14, prevent essentially all rolling and pitching of cab 12 relative to frame 14.

Figure 5:
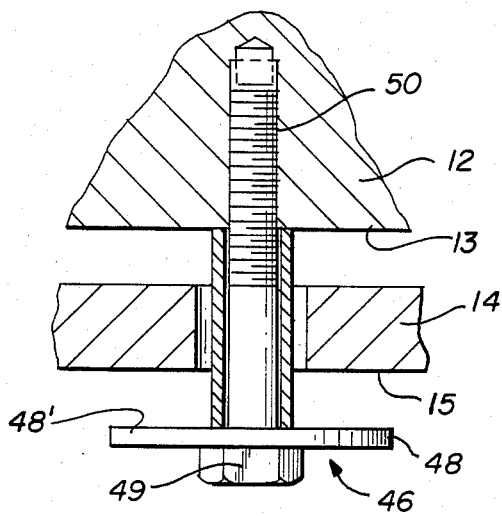
FIG. 5 is a sectional view illustrating a further detail of the present invention.

To restrain vertical movement of cab 12 relative to frame 14 during a catastrophic event, such as vehicle "roll-over", motion limiting means 44, 46, specifically illustrated in FIGS. 2 and 5 are provided. Essentially, and as shown in FIG. 5, motion limiting means 46 comprises a bolt or similar member 49 extending through frame 14 into the underside 13 of cab 12. As illustrated, bolt 49 has threads 50 permanently securing the bolt into underside 13 of cab 12. It should be observed, bolt 49 includes an elongated washer 48 forming a flange 48' at its end remote from cab 12. Bolt 49 is mounted so flange 48' is initially spaced from underside 15 of frame 14. Thus, although stabilizing plate 32 permits vertical movement of cab 12 relative to frame 14, motion limiting means 44, 46 prevents unrestrained vertical movement of the cab relative to the frame. Motion limiting means 44, 46 are effective to prevent the cab from unrestrained vertical movement relative to the frame in the event suspension means 20 fails, as for example, during a vehicle "roll-over". In normal operation elastomeric members 24 limit the maximum vertical movement of the cab.

By utilizing the relatively soft suspension system as described herein the cab is effectively isolated from the frame, yet the combination of motion limiting means 44, 46 and stabilizing plate 32 permit restrained movement of the cab parallel to the axis of the primary suspension members while preventing motion of the cab relative to the frame in any other direction.

Suspension means 20 is effective to isolate the cab from the major source of vibrations. As illustrated, vehicle 10 is a road planer and the major source of vibration is generated by the planer's cutting drum. As the major vibratory amplitude produced by the drum is a vertical direction; it is desirable to position the suspension means to primarily function to attenuate the major source of vibration, i.e., the suspension means primarily functions in a vertical direction.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A stabilizing and isolation system for mounting an operator cab on a vehicle frame comprising:
   means disposed between the underside of the cab and the frame for resiliently supporting the cab on the frame;
   a stabilizer linkage assembly connected to said frame and said cab for restraining rolling and pitching motion of said cab relative to said frame, said assembly including resilient means to permit relative vertical motion between said cab and said frame, said stabilizer linkage assembly comprising an essentially triangularly shaped plate extending in a horizontal plane between said cab and said frame, the apex of the plate being secured to a side of said cab and the base of the plate being secured to said frame; and
   motion limiting means connected to the frame and the cab for restraining vertical displacement of the cab relative to the frame in the event said resilient support means and said stabilizer linkage assembly should fail during a catastrophic event.

2. A stabilizing and isolation system in accordance with claim 1, further including a bracket assembly connected to the side of said cab, a vertical joining member connecting said bracket assembly to said plate and an elastomeric member mounted on said joining member and sandwiched between said bracket assembly and said plate.

3. A stabilizing and isolation system in accordance with claim 2 further including a bracket assembly connected to said frame; a pair of horizontally extending spaced joining members connecting said bracket assembly to said plate; and an elastomeric member mounted on each horizontally extending member and sandwiched between said plate and said bracket assembly.

4. A stabilizing and isolation system in accordance with claim 3 wherein the resilient supporting means comprises at least a pair of spaced elastomeric members formed from relatively soft resilient material having a relatively low spring rate.

* * * * *